Figure 1:
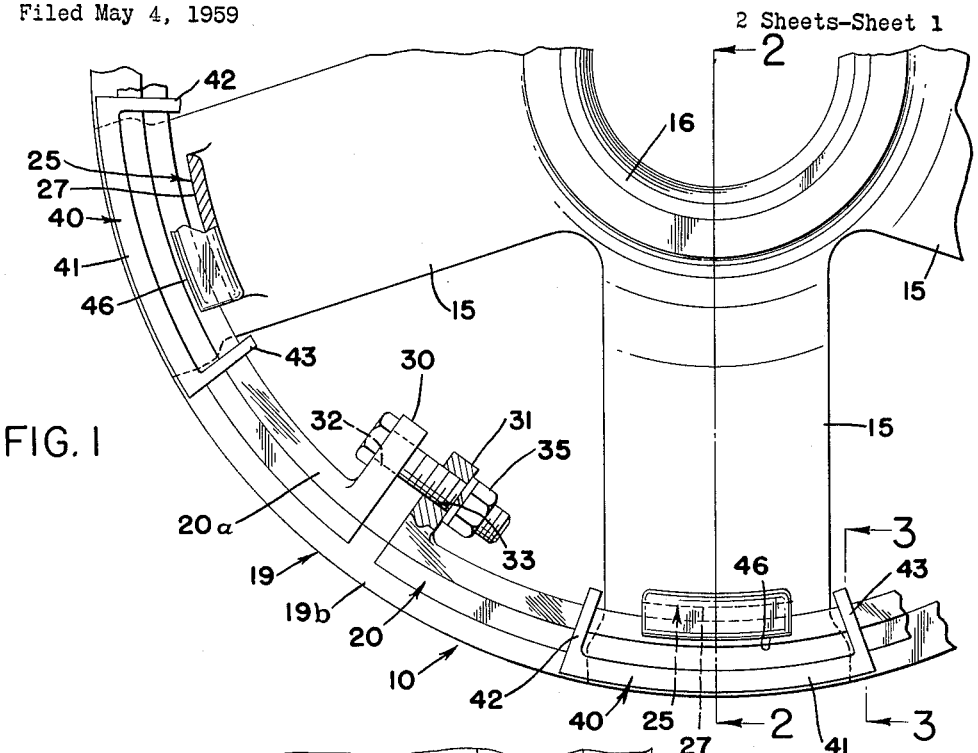

Jan. 4, 1966  D. A. WALTHER  3,227,493
CLAMPING DEVICE FOR RIM AND WHEEL ASSEMBLIES
Filed May 4, 1959  2 Sheets-Sheet 1

INVENTOR
DANIEL A. WALTHER

BY

ATTORNEYS

United States Patent Office 3,227,493
Patented Jan. 4, 1966

3,227,493
CLAMPING DEVICE FOR RIM AND WHEEL ASSEMBLIES
Daniel A. Walther, Dayton, Ohio, assignor to The Dayton Steel Foundry Company, Dayton, Ohio, a corporation of Ohio
Filed May 4, 1959, Ser. No. 810,805
3 Claims. (Cl. 301—13)

The present invention relates generally to clamping devices for rim and wheel assemblies. More particularly, the invention relates to an improved clamping device whereby dual rims, as used on vehicles such as trucks, tractors and trailers, may be demountably secured to a wheel.

A dual rim assembly for a vehicle includes the wheel attached to the vehicle axle, an inner rim carried on the wheel, a spacer band or extension or separating means to provide clearance for the dual tires, an outer rim, and clamping devices or fastening means securing the several elements of the assembly to the wheel. The prior art has seen countless types and forms of single and dual rim assemblies; with many and varied concepts of fastening means employed therewith. The present invention is concerned primarily with a novel and effective form of clamping device for securing an inner rim-spacer-outer rim assembly to a wheel; though the concepts thereof may be applied to other types of rim assemblies.

In the past, clamping devices or fastening means for dual rim assemblies have been according to at least three different concepts. In what is probably one of the earliest types, an inner rim was mounted on the brake drum of the wheel and secured by a wedge means and a series of fastening bolts. The outer rim was mounted on the wheel itself, separated from the brake drum by a suitable extension, and also secured by wedge means and fastening bolts. This type of mounting had the disadvantage that two distinct sets of fastening means were required and those for the inner rim were inaccessible from the outside of the wheel. This type may be seen, for example, in U.S. Patent No. 1,544,297.

The next or second type of clamping device overcame the disadvantages of the earlier types by providing fastening means for both the inner and outer rims which were equally accessible from the outside of the wheel. Several forms of this type were developed, but generally speaking, each assembly included an inner rim held in position on the wheel felly by a separator element or spacer band. Positive means such as bolts on the outer face of the wheel maintained the spacer band in position. The outer rim was maintained in position by a wedge means such as a ring or a plate which cooperatively engaged an extension of the spacer band and was secured by clamping lugs and bolts alternately spaced with the inner rim bolts. The principal objection to these types of clamping devices is their high initial cost, complexity and cost of maintenance. This type may be seen, for example, in U.S. Patent No. 1,838,050.

By far, the least expensive, both from the standpoint of initial cost and subsequent maintenance, is the type of clamping device employing a spacing band between the rims and a common means for simultaneously securing both rims in positions. As noted above, this art has tended toward complex types of clamping devices. One can only speculate as to the reasons. Nevertheless, the present invention has been developed because the inner rim-spacer band-outer rim and common fastening means type of assembly is considered to have important commercial advantages.

Therefore, it is the general object of the present invention to provide an improved construction for clamping devices for a rim assembly. Further, it is an object to provide an improved concept of fastening means for a dual inner rim-spacer band-outer rim assembly employing a common clamping device for both rims. Still further, it is an object to provide a rim clamping device which can be positively and safety secured in operative condition by merely tightening one bolt. These and other objects and advantages of the invention will become apparent in view of the following detailed description and the attached drawings.

Figure 2:
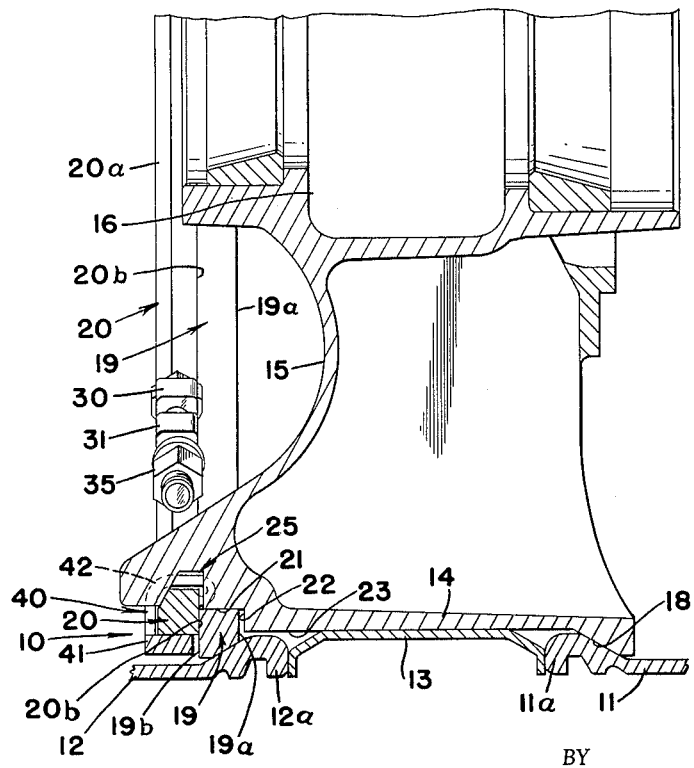
Figure 3:
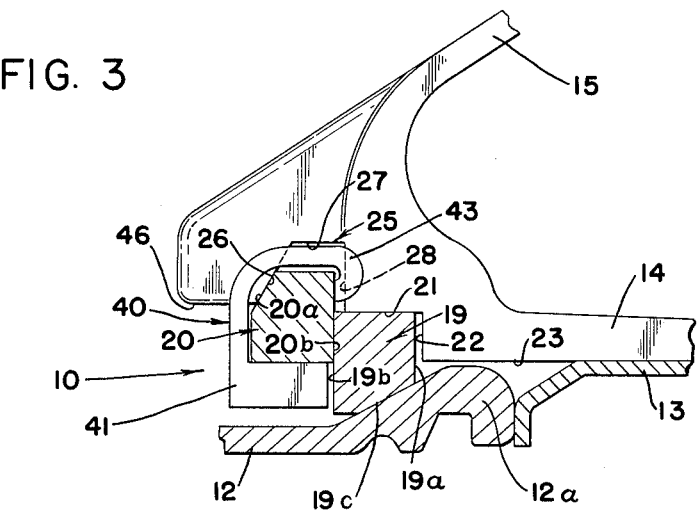
Figure 4:
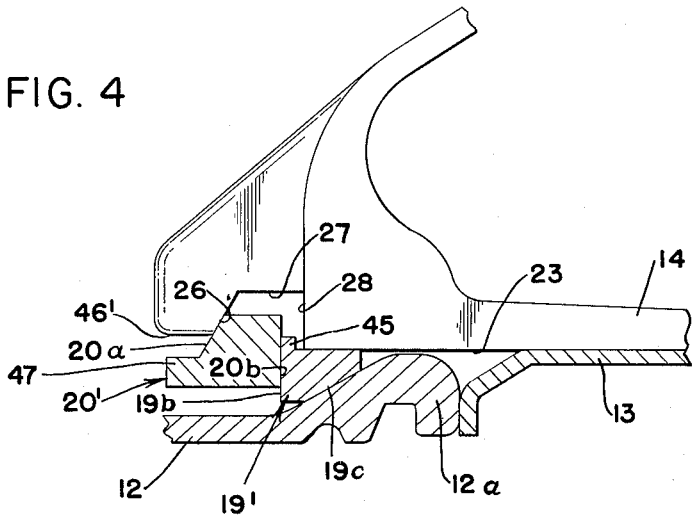

In the drawings:
FIG. 1 is a fragmentary outside view of the improved rim clamping device in an operative condition on the wheel;
FIG. 2 is a sectional view through the assembly, taken substantially on line 2—2 of FIG. 1;
FIG. 3 is an enlarged sectional view, taken substantially on line 3—3 of FIG. 1; and
FIG. 4 is a view similar to FIG. 3, through the assembly, showing an alternative form of the rim clamping device.

In general, an improved clamping device according to the invention comprises two annular or ring members, one preferably solid and the other split, which are mounted in juxtaposition in specially contoured and shaped grooves on the felly surface of a wheel and which cooperatively are displaced by a tightening means to secure an inner rim-spacer band-outer rim assembly in an operative condition on a vehicle wheel.

Referring to the drawings, the rim clamping device, indicated generally by the numeral 10, is installed to secure an inner rim 11 and an interchangeable outer rim 12, separated by a spacer ring 13, in operative condition on the felly 14 of a wheel having any desired number of spokes 15 and a conventional hub area 16. An inclined mounting flange 11a of the conventional inner rim is slidably seated on and carried by a standard 28° radially bevelled rim mounting surface 18 on the axially inner portion of the wheel felly 14. The rim clamping device 10 includes an inner ring 19 and a cooperating outer ring 20.

As best shown in FIG. 3, the inner ring 19, a preferably solid metal annulus member, is seated on a surface 21 of the wheel felly 14. The inner diameter of the ring 19 and the radial diameter of surface 21 are formed, as by machining or rolling, so that each is in close sliding fit and exactly parallel to the rotational axis of the wheel. The axially inner face of surface 21 terminates in a stop shoulder 22 extending perpendicular to the rotational axis of the wheel, which, with surface 21, defines a groove for the inner ring. At the radially outer end of shoulder 22, the central portion 23 of the wheel felly begins and extends axially inwardly of the wheel to the rim mounting surface 18, previously described. It will be noted that the radial diameter of the felly central or medial portion 23 is maintained slightly less than the smallest diameter of the mounting flanges of the inner and outer rims 11 and 12.

In addition to the inner surface 19a conforming with the radial shouldered felly surface 22, the ring 19 has an axially outer surface 19b and an axially inner radially outer corner surface 19c. The outer or front surface 19b is preferably exactly perpendicular to the rotational axis of the wheel for engagement with a surface on the outer ring 20, as described in detail below. The corner surface 19c has a standard 28° radial bevel providing a surface for slidably or wedgingly engaging the radially inwardly directed inclined mounting surface of the flange 12a of the conventional outer rim.

The outer ring 20, a split metal annulus member having a normal diameter smaller than the diameter of ring 19, is received within a circumferential groove or notch, indicated generally at 25, defined by an axially inwardly inclined outer surface 26, which intersects a surface 27 substantially parallel to the rotational axis of the wheel and having the smallest diameter of the notch elements, which intersects a perpendicular axially inner surface 28. The axially inner surface 20b of the ring 20 is formed to provide a close sliding fit with the perpendicular surface 19b of the inner ring. The axially outer radially inner corner surface 20a of the ring 20 is formed to provide a close sliding fit with the inclined surface 26 of notch 25. The angle of notch surface 26 and the conforming ring surface 20a to the rotational axis of the wheel may vary somewhat.

As described in detail below, the diameter of the split ring 20 is positively decreased to move the inner ring 19 into mounting contact with the outer rim 12. Such axially inward displacement of the ring 19 is obtained by the movement of ring surface 20a along notch surface 26. The exact taper or angle of surfaces 20a and 26, in relation to the rotational axis of the wheel, is not critical. If the angle approaches a perpendicular, then there would be insufficient axially inward displacement of ring 19. If the angle were to be axial or nearly so, the ring 19 would not be displaced with sufficient force to securely lock the outer rim of the assembly. Accordingly, the preferred angle of the surfaces 20a and 26 is from 20° to 40° from the radial with 28° (as shown) being suggested only by way of example.

Referring to FIG. 1, the ends of split ring 20 are preferably formed with similar, inwardly projecting, normally spaced apart opposed lugs or ends 30 and 31, have registering holes, 32 and 33 respectively, to accommodate a tightening means. As shown, the tightening means comprises a threaded bolt and nut 35. This is illustrative only and other forms of tightening means, such as a bolt threaded on opposite ends and mating with threads in holes 32 and 33, could be employed to reduce the diameter of the split ring 20 and assemble a dual rim assembly in operative condition on a wheel.

To provide a safety factor, such as required by I.C.C. regulations for truck operations, safety devices, indicated generally at 40, may be used in conjunction with the clamping device 10. Each locking device 40 is positioned at an end of a wheel spoke member 15 and includes an arcuate bar 41 which fills the gap between a tightened or decreased diameter ring 20 and an inner surface of a rim 12. At either end of the bar 41 are sturdy spring clip arms 42 and 43 which extend inwardly adjacent a spoke 15, over the ring 20 and frictionally engage or grip the ring surface 20b.

It is preferred that the safety locks 40 be used at the end of at least two wheel spoke members 15. However, this is not critical and a safety lock could be used at the end of each spoke member. If the wheel is of the disc-type, rather than spoked, the locks 40 could be positioned at spaced intervals around the outer circumference of the ring 20. With the lock 40 in position as disclosed, should the tightening means 34 break, or some other structural failure occur to ring 20, the assembly would not fall apart. With the mass of bar 41 substantially filling the gap between ring 20 and rim 12, the ring 23 could not fall completely free of contact with surface 26 of the felly notch 25 and the assembly, though perhaps loosened, would remain on the wheel and sufficiently intact to permit the driver to effectuate a safe stop.

FIG. 4 shows an alternative form of the rim clamping device 10. In this form the axially outer surface of the solid ring 19' is provided with a nubbin or lip 45 which extends perpendicularly inward and is adapted to engage notch surface 28 and prevent the ring 19' from being displaced too far axially inwardly, thereby deterring what might result in damaging stresses to the rims and the spacer 13. Referring momentarily to FIG. 3, it will be noted that the radial surface 46 at the end of each wheel spoke member has a diameter slightly less than the inner diameter of ring 19. In the FIG. 4 embodiment, the diameter of surface 46' would be further lessened to accommodate the ring 19' with inner projection 45.

FIG. 4 also shows a modification of ring 20' provided with an axially outer projection 47. The projection gives a greater cross-sectional area to the rings and thus adds strength as desired. The projection 47 could also be employed for an additional purpose. If the inner ring 19 (of FIG. 3) or 19' (of FIG. 4) were a split ring, the radial surface 46 or 46' of the spoke member could be extended radially outwardly a slight distance to provide a stop beyond which the diameter of ring 20 could not be decreased.

The above modifications are exemplary only and it is considered that various other changes and modifications could be made without departing from the basic concepts of the invention.

In conclusion, the above described invention particularly relates to an improved dual rim assembly in which an inner rim 11, with a tire thereon, may be placed on the wheel and mounted on the felly flange 18. The concentional spacer ring 13 is then mounted in contact with the inner rim. The outer rim 12, with a tire thereon, is then slipped over the wheel in contact with the spacer 13. The ring 19 or 19' is then fitted into place followed by the loosened split ring 20 or 20'. The tightening means 34 is then turned, decreasing the diameter of ring 20 and displacing ring 19 or 19' axially inwardly, thereby clamping the assembly in operative condition on the wheel.

It will further be apparent that although originally developed for use in dual rim assemblies, the clamping device 10 could be used with equal facility and ease to secure a single rim positioned radially of the felly surface 23 in operative condition on a wheel such, for example, as the front wheel of a vehicle.

What is claimed is:

1. A dual rim assembly for a vehicle wheel, said wheel having a felly surface seating the axially outer portion of an inner rim, a spacer ring axially outwardly of said inner rim, an outer rim positioned axially outwardly of said spacer and radially of said felly surface, an inner ring having an axially inner radially outer corner surface seating the axially inner portion of said outer rim and an axially outer surface perpendicular to the axis of rotation of the wheel, an outer ring having an axially inner surface conforming to the axially outer surface of said inner ring, means to decrease the diameter of said outer ring and displace the corner surface of said inner ring against said outer rim, and means positioned between said outer ring and the medial portion of said outer rim for maintaining the decreased diameter of said outer ring.

2. A dual rim assembly for a vehicle wheel, said wheel having a felly surface seating the axially outer portion of an inner rim, a spacer ring axially outwardly of said inner rim, an outer rim positioned axially outwardly of said spacer and radially of said felly surface, an inner ring having an axially inner radially outer-corner surface seating the axially inner portion of said outer rim and an axially outer surface perpendicular to the axis of rotation of the wheel, an outer ring having an axially inner surface conforming to the axially outer surface of said inner ring, means to decrease the diameter of said outer ring and displace the corner surface of said inner ring against said outer rim, and a series of arcuate bars positioned at spaced intervals between said outer ring and the medial portion of said outer rim for maintaining the decreased diameter of said outer ring, each bar having clip means extending radially inwardly engaging said outer ring.

3. A rim assembly for a vehicle wheel, said wheel having a felly surface for seating said rim, first and second rings positioned in juxtaposition axially outwardly of said rim on said wheel felly surface, means for decreasing the diameter of the first ring, inclined surfaces on said first ring and on said wheel having a close sliding fit to move said first ring axially inward against said second ring when the diameter of said first ring is reduced, said second ring being displaced against said rim by the axially inward movement of said first ring, and means positioned between said rim and said decreased diameter first ring for substantially maintaining both of said rings in said position.

References Cited by the Examiner

UNITED STATES PATENTS

| | | | |
|---|---|---|---|
| 1,139,151 | 5/1915 | Arthur | 301—26 X |
| 1,319,911 | 10/1919 | Spiegel | 301—22 |
| 1,838,050 | 12/1931 | Brunner | 301—22 |
| 1,959,754 | 5/1934 | Zipper | 301—22 |
| 2,024,264 | 12/1935 | Zipper | 301—12 |
| 2,188,271 | 1/1940 | Swain | 301—22 |
| 2,360,002 | 10/1944 | Lewis | 301—9 |

FOREIGN PATENTS

| | | |
|---|---|---|
| 27,827 | 1906 | Great Britain. |
| 30,663 | 9/1933 | Netherlands. |

BENJAMIN HERSH, *Primary Examiner.*

RICHARD A. DOUGLAS, JACOB A. MANIAN,
*Examiners.*

J. E. STAUDT, R. J. JOHNSON, *Assistant Examiners.*